(12) United States Patent
Brown et al.

(10) Patent No.: US 7,028,468 B2
(45) Date of Patent: Apr. 18, 2006

(54) PROCESS FOR REDUCING POLLUTANTS FROM THE EXHAUST OF A DIESEL ENGINE

(75) Inventors: Kevin Francis Brown, Newmarket (CA); Deborah Ann Langer, Chesterland, OH (US); David Duncan, Derbyshire (GB)

(73) Assignee: The Lubrizol Corporation, Wickliffe, OH (US)

( * ) Notice: Subject to any disclaimer, the term of this patent is extended or adjusted under 35 U.S.C. 154(b) by 63 days.

(21) Appl. No.: 10/408,507

(22) Filed: Apr. 7, 2003

(65) Prior Publication Data

US 2003/0167758 A1   Sep. 11, 2003

Related U.S. Application Data

(63) Continuation of application No. 09/557,953, filed on Apr. 24, 2000, now Pat. No. 6,606,856, which is a continuation-in-part of application No. 09/519,056, filed on Mar. 3, 2000, now abandoned.

(51) Int. Cl.
F01N 3/10 (2006.01)

(52) U.S. Cl. ..................... 60/299; 423/213.2
(58) Field of Classification Search ................. 60/299, 60/301, 286; 44/301, 354, 357
See application file for complete search history.

(56) References Cited

U.S. PATENT DOCUMENTS

| | | | |
|---|---|---|---|
| 2,858,200 A | 10/1958 | Broughten | |
| 3,540,866 A | 11/1970 | Miller | 44/51 |
| 3,756,794 A | 9/1973 | Ford | |
| 4,048,080 A | 9/1977 | Lee et al. | |
| 4,084,940 A | 4/1978 | Lissant | |
| 4,207,078 A | 6/1980 | Sweeney et al. | |
| 4,329,249 A | 5/1982 | Forsberg | |
| 4,368,133 A | 1/1983 | Forsberg | 252/75 |
| 4,447,348 A | 5/1984 | Forsberg | |
| 4,452,712 A | 6/1984 | Laemmle | |
| 4,482,356 A | 11/1984 | Hanlon | |
| 4,561,861 A | 12/1985 | Davis et al. | |
| 4,585,461 A | 4/1986 | Gorman | |
| 4,613,341 A | 9/1986 | Zaweski et al. | |
| 4,629,472 A | 12/1986 | Haney, III et al. | 44/51 |
| 4,708,753 A | 11/1987 | Forsberg | |
| 4,892,562 A | 1/1990 | Bowers et al. | |
| 4,907,368 A | 3/1990 | Mullay et al. | 44/51 |
| 4,952,328 A | 8/1990 | Davis et al. | 252/32.7 |
| 5,047,175 A | 9/1991 | Forsberg | 252/356 |
| 5,260,043 A * | 11/1993 | Li et al. | 423/239.2 |
| 5,271,370 A * | 12/1993 | Shimada et al. | 123/25 A |

(Continued)

FOREIGN PATENT DOCUMENTS

AU        711348        10/1997

(Continued)

OTHER PUBLICATIONS

Supplementary European Search Report, Application No. EP 00 97 0979, dated Apr. 15, 2004.

(Continued)

*Primary Examiner*—Thomas Denion
*Assistant Examiner*—Diem Tran
(74) *Attorney, Agent, or Firm*—Teresan W. Gilbert; Neil A. DuChez (57) ABSTRACT

This invention relates to a process for reducing the level of pollutants in the exhaust of a diesel engine, comprising: operating said diesel engine using as the fuel a water-diesel fuel emulsion; and contacting the exhaust gas from said diesel engine with an oxidation catalyst.

23 Claims, 2 Drawing Sheets

U.S. PATENT DOCUMENTS

| | | | |
|---|---|---|---|
| 5,279,626 A | 1/1994 | Cunningham et al. | |
| 5,352,377 A | 10/1994 | Blain et al. | |
| 5,360,458 A | 11/1994 | Forsberg et al. | 44/301 |
| 5,371,056 A | 12/1994 | Leyrer et al. | 502/66 |
| 5,389,111 A | 2/1995 | Nikanjam et al. | |
| 5,389,112 A | 2/1995 | Nikanjam et al. | |
| 5,404,841 A | 4/1995 | Valentine | 123/25 |
| 5,452,577 A | 9/1995 | Langer | 60/299 |
| 5,454,964 A | 10/1995 | Blackborow et al. | |
| 5,462,907 A | 10/1995 | Farrauto et al. | 502/304 |
| 5,491,120 A | 2/1996 | Voss et al. | 502/304 |
| 5,501,714 A | 3/1996 | Valentine et al. | |
| 5,503,772 A | 4/1996 | Rivas et al. | |
| 5,535,708 A | 7/1996 | Valentine | 123/25 |
| 5,584,894 A | 12/1996 | Peter-Hoblyn et al. | 44/301 |
| 5,627,124 A | 5/1997 | Farrauto et al. | 502/304 |
| 5,669,938 A | 9/1997 | Schwab | |
| 5,693,106 A | 12/1997 | Peter-Hoblyn et al. | 44/301 |
| 5,743,087 A * | 4/1998 | Zahn et al. | 60/301 |
| 5,743,922 A | 4/1998 | Peter-Hoblyn et al. | 44/301 |
| 5,746,783 A | 5/1998 | Compere et al. | 44/301 |
| 5,758,496 A * | 6/1998 | Rao et al. | 60/295 |
| 5,809,774 A | 9/1998 | Peter-Hoblyn et al. | 60/274 |
| 5,809,775 A | 9/1998 | Tarabulski et al. | 60/274 |
| 5,820,640 A | 10/1998 | Ikura et al. | 44/301 |
| 5,873,916 A | 2/1999 | Cemenska et al. | 44/301 |
| 5,879,419 A | 3/1999 | Moriyama et al. | |
| 5,924,280 A | 7/1999 | Tarabulski | 60/274 |
| 5,948,377 A * | 9/1999 | Sung | 423/231.5 |
| 5,976,475 A | 11/1999 | Peter-Hoblyn et al. | 423/212 |
| 5,987,882 A | 11/1999 | Voss et al. | 60/274 |
| 6,003,303 A * | 12/1999 | Peter-Hoblyn et al. | 60/274 |
| 6,006,516 A | 12/1999 | Voss et al. | 60/299 |
| 6,068,670 A | 5/2000 | Haupais et al. | 44/301 |
| 6,176,078 B1 | 1/2001 | Balko et al. | 60/286 |
| 6,203,770 B1 | 3/2001 | Peter-Hoblyn et al. | 423/212 |
| 6,280,485 B1 | 8/2001 | Daly et al. | 44/301 |
| 6,284,210 B1 * | 9/2001 | Euzen et al. | 423/213.5 |

FOREIGN PATENT DOCUMENTS

| | | |
|---|---|---|
| EP | 0 475 620 A2 | 3/1992 |
| EP | 0 561 600 A2 | 9/1993 |
| EP | 0 888 421 B1 | 7/1999 |
| WO | 96/28524 | 9/1996 |
| WO | 97/34969 | 9/1997 |

OTHER PUBLICATIONS

"Cellular Monolity Substrates"; DieselNet Technology Guide; 1998.

* cited by examiner

PROCESS FOR REDUCING POLLUTANTS FROM THE EXHAUST OF A DIESEL ENGINE

This application is a continuation of U.S. application Ser. No. 09/557,953, filed Apr. 24, 2000, now U.S. Pat. No. 6,606,856, which application is a continuation-in-part of U.S. application Ser. No. 09/519,056, filed Mar. 3, 2000, abandoned. The disclosures of each of these prior applications is incorporated herein by reference in its entirety.

TECHNICAL FIELD

This invention relates to a process for reducing the level of pollutants from the exhaust of a diesel engine. More particularly, this invention relates to a process for reducing the level of pollutants such as NOx and diesel particulate emissions from the exhaust of a diesel engine wherein a water-diesel fuel emulsion is used as the fuel and an oxidation catalyst is used to treat the engine exhaust.

BACKGROUND OF THE INVENTION

The term "NOx" is used herein to refer to any of the nitrogen oxides NO, $NO_2$, $N_2O$, or mixtures of two or more thereof. Over the past ten years, increasingly more stringent heavy duty on-highway engine emission regulations have led to the development of engines in which NOx and diesel particulate emissions have been reduced by as much as 70% and 90%, respectively.

Proposed regulations for new heavy duty engines require additional NOx and diesel particulate emission reductions of over 70% from existing emission limits. These emission reductions represent a continuing challenge to engine design due to the NOx-diesel particulate emission and fuel economy tradeoffs associated with most emission reduction strategies.

Emission reductions are also being sought from the on and off-highway in-use fleets. Within the heavy duty engine population, it is becoming more apparent that older engines are contributing a disproportionate amount of emissions toward the overall mobile source emissions inventories. Many of these engines have useful lives of over 15 years. To meet the air quality objectives in many regional areas, reductions in NOx and diesel particulate emissions will need to be derived from the in-use, mobile source engine population. In some regional areas, the proposed or required emission reductions from the engines in use potentially represent an even greater challenge than the emission limits proposed for new engines.

It is recognized that the engine, lubricants, fuel, aftertreatment and the engine application must be integrated into a system to maximize the control of emissions.

Recent engine work focuses on improvements or incorporation of new technologies to the power cylinder, air delivery, fuel management, and electronic systems. These improvements typically satisfy the emission requirements of new engines. Some improvements can also be implemented during the engine rebuild process; however, internal engine modifications are not broadly and practically applicable to in-use fleets.

Some new engines require the use of diesel specific oxidation catalysts to meet diesel particulate matter limits. This technology can be readily retrofitted.

In the urban environment, health concerns regarding diesel particulate emissions are resulting in thousands of buses being retrofitted with oxidation catalyst technologies. Similarly, natural gas buses frequently employ oxidation catalysts to maintain low particulate, carbon monoxide and hydrocarbon emissions.

In the United States, the implementation of the urban bus rebuild/retrofit requirements increased interest in emission reduction technologies that reduce emissions from in-use heavy duty diesel vehicle fleets.

In the United Kingdom and Sweden, many oxidation catalysts are also being installed in retrofit programs.

The retrofitting of heavy duty diesel engines with oxidation catalyst technologies has been utilized for on and off-highway vehicles used in mining, materials handling and other industrial markets. Worker health and safety is the primary reason for these applications.

A rapid series of diesel fuel improvements has been introduced in most parts of the developed world to provide reductions in particulates and NOx from the vehicle fleets in current operation as well as to facilitate the introduction of aftertreatment devices. Reducing the sulfur content and the "heavy end" of the fuel have been the key changes. In the U.K., government tax incentives have initiated the widespread use of a new grade of diesel fuel termed ultra low sulfur diesel (ULSD), which has a maximum 50 parts per million (ppm) sulfur content and a 95% distillation temperature of less than 345° C. As well as achieving immediate reductions in particulates and NOx from the current vehicle fleet, the availability of ULSD was intended to encourage the adoption of the latest exhaust oxidation catalysts whose operation is sensitive to higher fuel sulfur levels.

Diesel fuel improvements typically involve the reduction of fuel sulfur via hydrotreating to levels as low as 10 ppm (Swedish Mk 1 fuel). Other fuel parameters such as aromatics and cetane have also been the subject of investigation. Specially manufactured fuels and the incorporation of special fuel components such as biodiesels, Fisher Tropsch blends, methanol, and ethanol, are also gaining attention.

While many of the foregoing suggestions are meritorious, the problem remains that further reductions in pollutants, especially NOx and diesel particulate emissions, are required. The inventive process provides a solution to this problem.

SUMMARY OF THE INVENTION

This invention relates to a process for reducing the level of pollutants in the exhaust of a diesel engine, comprising: operating said diesel engine using as the fuel a water-diesel fuel emulsion; and contacting the exhaust from said diesel engine with an oxidation catalyst.

In one embodiment, the water-diesel fuel emulsion is comprised of water, diesel fuel and an emulsifier. The emulsifier may comprise: (i) at least one fuel-soluble product made by reacting at least one hydrocarbyl substituted carboxylic acid acylating agent with ammonia or an amine, the hydrocarbyl substituent of said acylating agent having about 50 to about 500 carbon atoms; (ii) an ionic or a nonionic compound having a hydrophilic-lipophilic balance (HLB) of about 1 to about 10; or a mixture of (i) and (ii); in combination with (iii) a water-soluble compound selected from the group consisting of amine salts, ammonium salts, azide compounds, nitro compounds, alkali metal salts, alkaline earth metal salts, and mixtures of two or more thereof. The water-diesel fuel emulsion may further comprise a cetane improver, organic solvent, antifreeze agent, and/or other additives known for their use in diesel fuel.

In one embodiment, the oxidation catalyst is comprised of flow-through passages of ceramic or metal coated with a washcoat comprised of zeolite, $Al_2O_3$, $SiO_2$, $TiO_2$, $CeO_2$, $ZrO_2$, $V_2O_5$, $La_2O_3$, or mixtures of two or more thereof, said washcoat supporting a catalyst selected from the group consisting of Pt, Pd, Rh, Ir, Ru, V, Cr, Mn, Fe, Co, Ni, Cu, Zn, Ag, Ce, Ga, or a mixture of two or more thereof. The oxidation catalyst may be housed in an in-line converter or converter muffler.

Unexpectedly, it has been found, at least in one embodiment, that by using the combination of a water-diesel fuel emulsion to operate the diesel engine and an oxidation catalyst to treat the exhaust from the engine, a synergy occurs whereby the reduction in NOx, diesel particulate matter, or both, is greater than the combined reductions resulting from the separate use of the water-diesel fuel emulsion without the oxidation catalyst and conventional diesel fuel with the oxidation catalyst.

BRIEF DESCRIPTION OF THE DRAWINGS

In the following figures, like references depict like parts and features.

DESCRIPTION OF THE PREFERRED EMBODIMENTS

As used herein, the terms "hydrocarbyl substituent," "hydrocarbyl group," "hydrocarbyl substituted," "hydrocarbon group," and the like, are used to refer to a group having one or more carbon atoms directly attached to the remainder of a molecule and having a hydrocarbon or predominantly hydrocarbon character. Examples include:

(1) purely hydrocarbon groups, that is, aliphatic (e.g., alkyl, alkenyl or alkylene), and alicyclic (e.g., cycloalkyl, cycloalkenyl) groups, aromatic groups, and aromatic-, aliphatic-, and alicyclic-substituted aromatic groups, as well as cyclic groups wherein the ring is completed through another portion of the molecule (e.g., two substituents together forming an alicyclic group);

(2) substituted hydrocarbon groups, that is, hydrocarbon groups containing non-hydrocarbon groups which, in the context of this invention, do not alter the predominantly hydrocarbon nature of the group (e.g., halo, hydroxy, alkoxy, mercapto, alkylmercapto, nitro, nitroso, and sulfoxy);

(3) hetero substituted hydrocarbon groups, that is, hydrocarbon groups containing substituents which, while having a predominantly hydrocarbon character, in the context of this invention, contain other than carbon in a ring or chain otherwise composed of carbon atoms. Heteroatoms include sulfur, oxygen and nitrogen. In general, no more than two, and in one embodiment no more than one, non-hydrocarbon substituent is present for every ten carbon atoms in the hydrocarbon group.

The term "lower" when used in conjunction with terms such as alkyl, alkenyl, and alkoxy, is intended to describe such groups that contain a total of up to 7 carbon atoms.

The term "water-soluble" refers to materials that are soluble in water to the extent of at least one gram per 100 milliliters of water at 25° C.

The term "fuel-soluble" refers to materials that are soluble in diesel fuel to the extent of at least one gram per 100 milliliters of diesel fuel at 25° C.

The Diesel Engines

The diesel engines that may be operated in accordance with the invention include all compression-ignition engines for both mobile (including marine) and stationary power plants. These include diesel engines of the two-stroke per cycle and four-stroke per cycle types. The diesel engines include heavy duty diesel engines. Included are on and off-highway engines, including new engines as well as in-use engines. The diesel engines that can be used include those used in automobiles, trucks, buses, locomotives, and the like. These include urban buses, as well as all classes of trucks.

The Water-Diesel Fuel Emulsions

In one embodiment, the water-diesel fuel emulsions are comprised of: a continuous diesel fuel phase; a discontinuous water or aqueous phase; and an emulsifying amount of an emulsifier. These emulsions may contain other chemical additives such as cetane improvers, organic solvents, antifreeze agents, and the like. These emulsions may be prepared by the steps of (1) mixing the diesel fuel, emulsifier and other desired chemical additives using standard mixing techniques to form a diesel fuel-chemical additives mixture; and (2) mixing the diesel fuel-chemical additives mixture with water (and optionally an antifreeze agent) under high shear mixing conditions to form the desired water-diesel fuel emulsion. Alternatively, the water soluble compounds (iii) used in the emulsifier can be mixed with the water prior to the high sheer mixing.

An example of a high-shear mixer that may be used is a Dispax-Reactor DR 3/9 made by IKA-Maschinbau equipped with a 20 HP motor. In one embodiment, this mixer has three Ultra-Turrax UTL-T . . . /8 rotor-stators arranged in series, and the rotors rotate at about 5500 rpm.

In one embodiment, the water or aqueous phase of the water-diesel fuel emulsion is comprised of droplets having a mean diameter of 1.0 micron or less. Thus, the high shear mixing is conducted under sufficient conditions to provide such a droplet size. In one embodiment, the mean droplet size is less than about 0.95 micron, and in one embodiment less than about 0.8 micron, and in one embodiment less than about 0.7 micron. In one embodiment, the mean droplet size is in the range of about 0.001 to about 1.0 micron, and in one embodiment about 0.001 to about 0.95 micron, and in one embodiment about 0.01 to about 0.95 micron, and in one embodiment about 0.01 to about 0.8 micron, and in one embodiment about 0.01 to about 0.7 micron. In one embodiment, the mean droplet size is in the range of about 0.1 to about 0.7 micron.

The Diesel Fuels

The diesel fuel may be any diesel fuel. These diesel fuels typically have a 90% point distillation temperature in the range of about 295° C. to about 390° C., and in one embodiment about 330° C. to about 350° C. The viscosity for these fuels typically ranges from about 1 to about 24 centistokes at 40° C. The diesel fuels may be classified as any of Grade Nos. 1-D, 2-D or 4-D as specified in ASTM D975. These diesel fuels may contain alcohols (e.g., methanol, ethanol, and the like), esters, and fuel components such as biodiesels, Fisher Tropsch blends, and the like. In one embodiment, the diesel fuel is an ultra low sulfur diesel fuel (ULSD) having a maximum of 50 ppm sulfur and a 95% distillation temperature of less than about 345° C. In one embodiment the diesel fuel has a sulfur content of up to about 0.05% by weight as determined by the test method specified in ASTM D2622-87. In one embodiment, the diesel fuel is a chlorine-free or low-chlorine diesel fuel characterized by a chlorine content of no more than about 10 ppm.

The diesel fuel may be present in the water-diesel fuel emulsions at a concentration of about 50% to about 98% by weight, and in one embodiment about 50% to about 95% by weight, and in one embodiment about 60% to about 95% by weight, and in one embodiment about 75% to about 95% by weight, and in one embodiment about 75% to about 92% by weight.

The Water

The water used in forming the water-diesel fuel emulsions may be taken from any source. In one embodiment, the water is deionized or demineralized prior to being mixed with the diesel fuel. In one embodiment, the water is purified using reverse osmosis or distillation.

The water may be present in the water-diesel fuel emulsions at a concentration of about 1% to about 50% by weight, and in one embodiment about 5% to about 50% by weight, and in one embodiment about 5% to about 40% being weight, and in one embodiment about 5% to about 25% by weight, and in one embodiment about 10% to about 20% water.

The Emulsifier

In one embodiment, the emulsifier is comprised of: (i) at least one fuel-soluble product made by reacting at least one hydrocarbyl substituted carboxylic acid acylating agent with ammonia or an amine, the hydrocarbyl substituent of said acylating agent having about 50 to about 500 carbon atoms; (ii) an ionic or a nonionic compound having a hydrophilic-lipophilic balance (HLB) of about 1 to about 10; or a mixture of (i) and (ii); in combination with (iii) a water-soluble compound selected from the group consisting of amine salts, ammonium salts, azide compounds, nitro compounds, alkali metal salts, alkaline earth metal salts, and mixtures of two or more thereof. Mixtures of (i), (ii) and (iii) are useful.

The emulsifier may be present in the water-diesel fuel emulsion at a concentration of about 0.05% to about 20% by weight, and in one embodiment about 0.05% to about 10% by weight, and in one embodiment about 0.1% to about 5% by weight, and in one embodiment about 0.1% to about 3% by weight.

The Fuel-Soluble Product (i)

The fuel soluble product (i) may be at least one fuel-soluble product made by reacting at least one hydrocarbyl substituted carboxylic acid acylating agent with ammonia or an amine, the hydrocarbyl substituent of said acylating agent having about 50 to about 500 carbon atoms.

The hydrocarbyl substituted carboxylic acid acylating agents may be carboxylic acids or reactive equivalents of such acids. The reactive equivalents may be an acid halides, anhydrides, or esters, including partial esters and the like. The hydrocarbyl substituents for these carboxylic acid acylating agents may contain from about 50 to about 500 carbon atoms, and in one embodiment about 50 to about 300 carbon atoms, and in one embodiment about 60 to about 200 carbon atoms. In one embodiment, the hydrocarbyl substituents of these acylating agents have number average molecular weights of about 700 to about 3000, and in one embodiment about 900 to about 2300.

The hydrocarbyl substituted carboxylic acid acylating agents may be made by reacting one or more alpha-beta olefinically unsaturated carboxylic acid reagents containing 2 to about 20 carbon atoms, exclusive of the carboxyl groups, with one or more olefin polymers as described more fully hereinafter.

The alpha-beta olefinically unsaturated carboxylic acid reagents may be either monobasic or polybasic in nature. Exemplary of the monobasic alpha-beta olefinically unsaturated carboxylic acid include the carboxylic acids corresponding to the formula wherein R is hydrogen, or a saturated aliphatic or alicyclic, aryl, alkylaryl or heterocyclic group, preferably hydrogen or a lower alkyl group, and $R^1$ is hydrogen or a lower alkyl group. The total number of carbon atoms in R and $R^1$ typically does not exceed about 18 carbon atoms. Specific examples of useful monobasic alpha-beta olefinically unsaturated carboxylic acids include acrylic acid; methacrylic acid; cinnamic acid; crotonic acid; 3-phenyl propenoic acid; alpha, and beta-decenoic acid. The polybasic acid reagents are preferably dicarboxylic, although tri- and tetracarboxylic acids can be used. Exemplary polybasic acids include maleic acid, fumaric acid, mesaconic acid, itaconic acid and citraconic acid. Reactive equivalents of the alpha-beta olefinically unsaturated carboxylic acid reagents include the anhydride, ester or amide functional derivatives of the foregoing acids. A useful reactive equivalent is maleic anhydride.

The olefin monomers from which the olefin polymers may be derived are polymerizable olefin monomers characterized by having one or more ethylenic unsaturated groups. They may be monoolefinic monomers such as ethylene, propylene, 1-butene, isobutene and 1-octene or polyolefinic monomers (usually di-olefinic monomers such as 1,3-butadiene and isoprene). Usually these monomers are terminal olefins, that is, olefins characterized by the presence of the group>C=CH$_2$. However, certain internal olefins can also serve as monomers (these are sometimes referred to as medial olefins). When such medial olefin monomers are used, they normally are employed in combination with terminal olefins to produce olefin polymers that are interpolymers. Although, the olefin polymers may also include aromatic groups (especially phenyl groups and lower alkyl and/or lower alkoxy-substituted phenyl groups such as para (tertiary-butyl)-phenyl groups) and alicyclic groups such as would be obtained from polymerizable cyclic olefins or alicyclic-substituted polymerizable cyclic olefins, the olefin polymers are usually free from such groups. Nevertheless, olefin polymers derived from such interpolymers of both 1,3-dienes and styrenes such as 1,3-butadiene and styrene or para-(tertiary butyl) styrene are exceptions to this general rule. In one embodiment, the olefin polymer is a partially hydrogenated polymer derived from one or more dienes.

Generally the olefin polymers are homo- or interpolymers of terminal hydrocarbyl olefins of about 2 to about 30 carbon atoms, and in one embodiment about 2 to about 16 carbon atoms. A more typical class of olefin polymers is selected from that group consisting of homo- and interpolymers of terminal olefins of 2 to about 6 carbon atoms, and in one embodiment 2 to about 4 carbon atoms.

Specific examples of terminal and medial olefin monomers which can be used to prepare the olefin polymers include ethylene, propylene, 1-butene, 2-butene, isobutene, 1-pentene, 1-hexene, 1-heptene, 1-octene, 1-nonene, 1-decene, 2-pentene, propylene tetramer, diisobutylene, isobutylene trimer, 1,2-butadiene, 1,3-butadiene, 1,2-pentadiene, 1,3-pentadiene, isoprene, 1,5-hexadiene, 2-chloro 1,3-butadiene, 2-methyl-1-heptene, 3-cyclohexyl-1 butene, 3,3-dimethyl 1-pentene, styrene, divinylbenzene, vinyl-acetate, allyl alcohol, 1-methylvinylacetate, acrylonitrile, ethyl acrylate, ethylvinylether and methyl-vinylketone. Of these, the purely hydrocarbon monomers are more typical and the terminal olefin monomers are especially useful.

In one embodiment, the olefin polymers are polyisobutenes such as those obtained by polymerization of a $C_4$ refinery stream having a butene content of about 35 to about 75% by weight and an isobutene content of about 30 to about 60% by weight in the presence of a Lewis acid catalyst such as aluminum chloride or boron trifluoride. These polyisobutenes generally contain predominantly (that is, greater than about 50 percent of the total repeat units) isobutene repeat units of the configuration In one embodiment, the olefin polymer is a polyisobutene group (or polyisobutylene group) having a number average molecular weight of about 700 to about 3000, and in one embodiment about 900 to about 2300.

In one embodiment, the hydrocarbyl substituted carboxylic acid acylating agent is a hydrocarbyl-substituted succinic acid or anhydride represented correspondingly by the formulae wherein R is hydrocarbyl group of about 50 to about 500 carbon atoms, and in one embodiment from about 50 to about 300, and in one embodiment from about 60 to about 200 carbon atoms. The production of these hydrocarbyl-substituted succinic acids or anhydrides via alkylation of maleic acid or anhydride or its derivatives with a halohydrocarbon or via reaction of maleic acid or anhydride with an olefin polymer having a terminal double bond is well known to those of skill in the art and need not be discussed in detail herein.

The hydrocarbyl substituted carboxylic acid acylating agent may be a hydrocarbyl-substituted succinic acylating agent consisting of hydrocarbyl substituent groups and succinic groups. The hydrocarbyl substituent groups are derived from olefin polymers as discussed above. In one embodiment, the hydrocarbyl substituted carboxylic acid acylating agent is characterized by the presence within its structure of an average of at least 1.3 succinic groups, and in one embodiment from about 1.3 to about 2.5, and in one embodiment about 1.5 to about 2.5, and in one embodiment from about 1.7 to about 2.1 succinic groups for each equivalent weight of the hydrocarbyl substituent. In one embodiment, the hydrocarbyl substituted carboxylic acid acylating agent is characterized by the presence within its structure of about 1.0 to about 1.3, and in one embodiment about 1.0 to about 1.2, and in one embodiment from about 1.0 to about 1.1 succinic groups for each equivalent weight of the hydrocarbyl substituent.

In one embodiment, the hydrocarbyl substituted carboxylic acid acylating agent is a polyisobutene substituted succinic anhydride, the polyisobutene substituent having a number average molecular weight of about 1500 to about 3000, and in one embodiment about 1800 to about 2300, said first polyisobutene substituted succinic anhydride being characterized by about 1.3 to about 2.5, and in one embodiment about 1.7 to about 2.1 succinic groups per equivalent weight of the polyisobutene substituent.

In one embodiment, the hydrocarbyl substituted carboxylic acid acylating agent is a polyisobutene substituted succinic anhydride, the polyisobutene substituent having a number average molecular weight of about 700 to about 1300, and in one embodiment about 800 to about 1000, said polyisobutene substituted succinic anhydride being characterized by about 1.0 to about 1.3, and in one embodiment about 1.0 to about 1.2 succinic groups per equivalent weight of the polyisobutene substituent.

For purposes of this invention, the equivalent weight of the hydrocarbyl substituent group of the hydrocarbyl-substituted succinic acylating agent is deemed to be the number obtained by dividing the number average molecular weight ($M_n$) of the polyolefin from which the hydrocarbyl substituent is derived into the total weight of all the hydrocarbyl substituent groups present in the hydrocarbyl-substituted succinic acylating agents. Thus, if a hydrocarbyl-substituted acylating agent is characterized by a total weight of all hydrocarbyl substituents of 40,000 and the $M_n$ value for the polyolefin from which the hydrocarbyl substituent groups are derived is 2000, then that substituted succinic acylating agent is characterized by a total of 20 (40,000/2000=20) equivalent weights of substituent groups.

The ratio of succinic groups to equivalent of substituent groups present in the hydrocarbyl-substituted succinic acylating agent (also called the "succination ratio") can be determined by one skilled in the art using conventional techniques (such as from saponification or acid numbers). For example, the formula below can be used to calculate the succination ratio where maleic anhydride is used in the acylation process:

$$SR = \frac{M_n \times (\text{Sap. No. of acylating agent})}{(56100 \times 2) - (98 \times \text{Sap. No. of acylating agent})}$$

In this equation, SR is the succination ratio, $M_n$ is the number average molecular weight, and Sap. No. is the saponification number. In the above equation, Sap. No. of acylating agent=measured Sap. No. of the final reaction mixture/AI wherein AI is the active ingredient content expressed as a number between 0 and 1, but not equal to zero. Thus an active ingredient content of 80% corresponds to an AI value of 0.8. The AI value can be calculated by using techniques such as column chromatography which can be used to determine the amount of unreacted polyalkene in the final reaction mixture. As a rough approximation, the value of AI is determined after subtracting the percentage of unreacted polyalkene from 100.

The fuel-soluble product (i) may be formed using ammonia and/or an amine. The amines useful for reacting with the acylating agent to form the product (i) include monoamines, polyamines, and mixtures thereof.

The monoamines have only one amine functionality whereas the polyamines have two or more. The amines may be primary, secondary or tertiary amines. The primary amines are characterized by the presence of at least one —NH$_2$ group; the secondary by the presence of at least one H—N< group. The tertiary amines are analogous to the primary and secondary amines with the exception that the hydrogen atoms in the —NH$_2$ or H—N< groups are replaced by hydrocarbyl groups. Examples of primary and secondary monoamines include ethylamine, diethylamine, n-butylamine, di-n-butylamine, allylamine, isobutylamine, cocoamine, stearylamine, laurylamine, methyllaurylamine, oleylamine, N-methyloctylamine, dodecylamine, and octadecylamine. Suitable examples of tertiary monoamines include trimethylamine, triethylamine, tripropylamine, tributylamine, monomethyldimethylamine, monoethyldimethylamine, dimethylpropylamine, dimethylbutylamine, dimethylpentylamine, dimethylhexylamine, dimethylheptylamine, and dimethyloctylamine.

The amine may be a hydroxyamine. The hydroxyamine may be a primary, secondary or tertiary amine. Typically, the hydroxamines are primary, secondary or tertiary alkanol amines. The alkanol amines may be represented by the formulae:

wherein in the above formulae each R is independently a hydrocarbyl group of 1 to about 8 carbon atoms, or a hydroxy-substituted hydrocarbyl group of 2 to about 8 carbon atoms and each R' independently is a hydrocarbylene (i.e., a divalent hydrocarbon) group of 2 to about 18 carbon atoms. The group —R'—OH in such formulae represents the hydroxy-substituted hydrocarbylene group. R' may be an acyclic, alicyclic, or aromatic group. In one embodiment, is R' is an acyclic straight or branched alkylene group such as ethylene, 1,2-propylene, 1,2-butylene, 1,2-octadecylene, etc. group. When two R groups are present in the same molecule they may be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxy lower alkyl)-morpholines, -thiomorpholines, -piperidines, -oxazolidines, -thiazolidines and the like. Typically, however, each R is independently a lower alkyl group of up to seven carbon atoms.

Suitable examples of the above hydroxyamines include mono-, di-, and triethanolamine, dimethylethanol amine, diethylethanol amine, di-(3-hydroxy propyl) amine, N-(3-hydroxybutyl) amine, N-(4-hydroxy butyl) amine, and N,N-di-(2-hydroxypropyl) amine.

The amine may be an alkylene polyamine. Especially useful are the alkylene polyamines represented by the formula wherein n has an average value between 1 and about 10, and in one embodiment about 2 to about 7, the "Alkylene" group has from 1 to about 10 carbon atoms, and in one embodiment about 2 to about 6 carbon atoms, and each R is independently hydrogen, an aliphatic or hydroxy-substituted aliphatic group of up to about 30 carbon atoms. These alkylene polyamines include methylene polyamines, ethylene polyamines, butylene polyamines, propylene polyamines, pentylene polyamines, etc. Specific examples of such polyamines include ethylene diamine, triethylene tetramine, propylene diamine, trimethylene diamine, tripropylene tetramine, tetraethylene pentamine, hexaethylene heptamine, pentaethylene hexamine, or a mixture of two or more thereof.

Ethylene polyamines are useful. These are described in detail under the heading Ethylene Amines in Kirk Othmer's "Encyclopedia of Chemical Technology", 2d Edition, Vol. 7, pages 22–37, Interscience Publishers, New York (1965). These polyamines may be prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as piperazines.

In one embodiment, the amine is a polyamine bottoms or a heavy polyamine. The term "polyamine bottoms" refers to those polyamines resulting from the stripping of a polyamine mixture to remove lower molecular weight polyamines and volatile components to leave, as residue, the polyamine bottoms. In one embodiment, the polyamine bottoms are characterized as having less than about 2% by weight total diethylene triamine or triethylene tetramine. A useful polyamine bottoms is available from Dow Chemical under the trade designation E-100. This material is described as having a specific gravity at 15.6° C. of 1.0168, a nitrogen content of 33.15% by weight, and a viscosity at 40° C. of 121 centistokes. Another polyamine bottoms that may be used is commercially available from Union Carbide under the trade designation HPA-X. This polyamine bottoms product contains cyclic condensation products such as piperazine and higher analogs of diethylene triamine, triethylene tetramine, and the like.

The term "heavy polyamine" refers to polyamines that contain seven or more nitrogen atoms per molecule, or polyamine oligomers containing seven or more nitrogens per molecule, and two or more primary amines per molecule. These are described in European Patent No. EP 0770098, which is incorporated herein by reference for its disclosure of such heavy polyamines.

The fuel-soluble product (i) may be a salt, an ester, an ester/salt, an amide, an imide, or a combination of two or more thereof. The salt may be an internal salt involving residues of a molecule of the acylating agent and the ammonia or amine wherein one of the carboxyl groups becomes ionically bound to a nitrogen atom within the same group; or it may be an external salt wherein the ionic salt group is formed with a nitrogen atom that is not part of the same molecule. In one embodiment, the amine is a hydroxyamine, the hydrocarbyl substituted carboxylic acid acylating agent is a hydrocarbyl substituted succinic anhydride, and the resulting fuel-soluble product is a half ester and half salt, i.e., an ester/salt. In one embodiment, the amine is an alkylene polyamine, the hydrocarbyl substituted carboxylic acid acylating agent is a hydrocarbyl substituted succinic anhydride, and the resulting fuel-soluble product is a succinimide.

The reaction between the hydrocarbyl substituted carboxylic acid acylating agent and the ammonia or amine is carried out under conditions that provide for the formation of the desired product. Typically, the hydrocarbyl substituted carboxylic acid acylating agent and the ammonia or amine are mixed together and heated to a temperature in the range of from about 50° C. to about 250° C., and in one embodiment from about 80° C. to about 200° C.; optionally in the presence of a normally liquid, substantially inert organic liquid solvent/diluent, until the desired product has formed. In one embodiment, the hydrocarbyl substituted carboxylic acid acylating agent and the ammonia or amine are reacted in amounts sufficient to provide from about 0.3 to about 3 equivalents of hydrocarbyl substituted carboxylic acid acylating agent per equivalent of ammonia or amine. In one embodiment, this ratio is from about 0.5:1 to about 2:1, and in one embodiment about 1:1.

In one embodiment, the fuel soluble product (i) comprises: (i)(a) a first fuel-soluble product made by reacting a first hydrocarbyl substituted carboxylic acid acylating agent with ammonia or an amine, the hydrocarbyl substituent of said first acylating agent having about 50 to about 500 carbon atoms; and (i)(b) a second fuel-soluble product made by reacting a second hydrocarbyl substituted carboxylic acid acylating agent with ammonia or an amine, the hydrocarbyl substituent of said second acylating agent having about 50 to about 500 carbon atoms. In this embodiment, the products (i)(a) and (i)(b) are different. For example, the molecular weight of the hydrocarbyl substituent for the first acylating agent may be different than the molecular weight of the hydrocarbyl substituent for the second acylating agent. In one embodiment, the number average molecular weight for the hydrocarbyl substituent for the first acylating agent may be in the range of about 1500 to about 3000, and in one embodiment about 1800 to about 2300, and the number average molecular weight for the hydrocarbyl substituent for the second acylating agent may be in the range of about 700 to about 1300, and in one embodiment about 800 to about 1000. The first hydrocarbyl substituted carboxylic acid acylating agent may be a polyisobutene substituted succinic anhydride, the polyisobutene substituent having a number average molecular weight of about 1500 to about 3000, and in one embodiment about 1800 to about 2300. This first polyisobutene substituted succinic anhydride may be characterized by at least about 1.3, and in one embodiment about 1.3 to about 2.5, and in one embodiment about 1.7 to about 2.1 succinic groups per equivalent weight of the polyisobutene substituent. The amine used in this first fuel-soluble product (i)(a) may be an alkanol amine and the product may be in the form of an ester/salt. The second hydrocarbyl substituted carboxylic acid acylating agent may be a polyisobutene substituted succinic anhydride, the polyisobutene substituent of said second polyisobutene substituted succinic anhydride having a number average molecular weight of about 700 to about 1300, and in one embodiment about 800 to about 1000. This second polyisobutene substituted succinic anhydride may be characterized by about 1.0 to about 1.3, and in one embodiment about 1.0 to about 1.2 succinic groups per equivalent weight of the polyisobutene substituent. The amine used in this second fuel-soluble product (i)(b) may be an alkanol amine and the product may be in the form of an ester/salt, or the amine may be an alkylene polyamine and the product may be in the form of a succinimide. The fuel-soluble product (i) may be comprised of: about 1% to about 99% by weight, and in one embodiment about 30% to about 70% by weight of the product (i)(a); and about 99% to about 1% by weight, and in one embodiment about 70% to about 30% by weight of the product (i) (b).

In one embodiment, the fuel soluble product (i) comprises: (i)(a) a first hydrocarbyl substituted carboxylic acid acylating agent, the hydrocarbyl substituent of said first acylating agent having about 50 to about 500 carbon atoms; and (i)(b) a second hydrocarbyl substituted carboxylic acid acylating agent, the hydrocarbyl substituent of said second acylating agent having about 50 to about 500 carbon atoms, said first acylating agent and said second acylating agent being the same or different; said first acylating agent and said second acylating agent being coupled together by a linking group derived from a compound having two or more primary amino groups, two or more secondary amino groups, at least one primary amino group and at least one secondary amino group, at least two hydroxyl groups, or at least one primary or secondary amino group and at least one hydroxyl group; said coupled acylating agents being reacted with ammonia or an amine. The molecular weight of the hydrocarbyl substituent for the first acylating agent may be the same as or it may be different than the molecular weight of the hydrocarbyl substituent for the second acylating agent. In one embodiment, the number average molecular weight for the hydrocarbyl substituent for the first and/or second acylating agent is in the range of about 1500 to about 3000, and in one embodiment about 1800 to about 2300. In one embodiment, the number average molecular weight for the hydrocarbyl substituent for the first and/or second acylating agent is in the range of about 700 to about 1300, and in one embodiment about 800 to about 1000. The first and/or second hydrocarbyl substituted carboxylic acid acylating agent may be a polyisobutene substituted succinic anhydride, the polyisobutene substituent having a number average molecular weight of about 1500 to about 3000, and in one embodiment about 1800 to about 2300. This first and/or second polyisobutene substituted succinic anhydride may be characterized by at least about 1.3, and in one embodiment about 1.3 to about 2.5, and in one embodiment about 1.7 to about 2.1 succinic groups per equivalent weight of the polyisobutene substituent. The first and/or second hydrocarbyl substituted carboxylic acid acylating agent may be a polyisobutene substituted succinic anhydride, the polyisobutene substituent having a number average molecular weight of about 700 to about 1300, and in one embodiment about 800 to about 1000. This first and/or second polyisobutene substituted succinic anhydride may be characterized by about 1.0 to about 1.3, and in one embodiment about 1.0 to about 1.2 succinic groups per equivalent weight of the polyisobutene substituent. The linking group may be derived from any of the amines or hydroxamines discussed above having two or more primary amino groups, two or more secondary amino groups, at least one primary amino group and at least one secondary amino group, or at least one primary or secondary amino group and at least one hydroxyl group. The linking group may also be derived from a polyol. The polyol may be a compound represented by the formula wherein in the foregoing formula, R is an organic group having a valency of m, R is joined to the OH groups through carbon-to-oxygen bonds, and m is an integer from 2 to about 10, and in one embodiment 2 to about 6. The polyol may be a glycol. The alkylene glycols are useful. Examples of the polyols that may be used include ethylene glycol, diethylene glycol, triethylene glycol, tetraethylene glycol, propylene glycol, dipropylene glycol, tripropylene glycol, dibutylene glycol, tributylene glycol, 1,2-butanediol, 2,3-dimethyl-2,3-butanediol, 2,3-hexanediol, 1,2-cyclohexanediol, pentaerythritol, dipentaerythritol, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, 2,2,66-tetrakis-(hydroxymethyl) cyclohexanol, 1,10-decanediol, digitalose, 2-hydroxymethyl-2-methyl-1, 3- propanediol (trimethylolethane), or 2-hydroxymethyl-2-ethyl-1,3-propanediol (trimethylopropane), and the like. Mixtures of two or more of the foregoing can be used.

The ratio of reactants utilized in the preparation of these linked products may be varied over a wide range. Generally, for each equivalent of each of the first and second acylating agents, at least about one equivalent of the linking compound is used. The upper limit of linking compound is about two equivalents of linking compound for each equivalent of the first and second acylating agents. Generally the ratio of equivalents of the first acylating agent to the second acylating agent is about 4:1 to about 1:4, and in one embodiment about 1.5:1.

The number of equivalents for the first and second acylating agents is dependent on the total number of carboxylic functions present in each. In determining the number of equivalents for each of the acylating agents, those carboxyl functions which are not capable of reacting as a carboxylic acid acylating agent are excluded. In general, however, there is one equivalent of each acylating agent for each carboxy group in the acylating agents. For example, there would be two equivalents in an anhydride derived from the reaction of one mole of olefin polymer and one mole of maleic anhydride.

The weight of an equivalent of a polyamine is the molecular weight of the polyamine divided by the total number of nitrogens present in the molecule. When the polyamine is to be used as linking compound, tertiary amino groups are not counted. The weight of an equivalent of a commercially available mixture of polyamines can be determined by dividing the atomic weight of nitrogen (14) by the % N contained in the polyamine; thus, a polyamine mixture having a % N of 34 would have an equivalent weight of 41.2. The weight of an equivalent of ammonia or a monoamine is equal to its molecular weight.

The weight of an equivalent of a polyol is its molecular weight divided by the total number of hydroxyl groups present in the molecule. Thus, the weight of an equivalent of ethylene glycol is one-half its molecular weight.

The weight of an equivalent of a hydroxyamine which is to be used as a linking compound is equal to its molecular weight divided by the total number of —OH, >NH and —NH$_2$ groups present in the molecule.

The first and second acylating agents may be reacted with the linking compound according to conventional ester and/or amide-forming techniques. This normally involves heating acylating agents with the linking compound, optionally in the presence of a normally liquid, substantially inert, organic liquid solvent/diluent. Temperatures of at least about 30° C. up to the decomposition temperature of the reaction component and/or product having the lowest such temperature can be used. This temperature may be in the range of about 50° C. to about 130° C., and in one embodiment about 80° C. to about 100° C. when the acylating agents are anhydrides. On the other hand, when the acylating agents are acids, this temperature may be in the range of about 100° C. to about 300° C. with temperatures in the range of about 125° C. to about 250° C. often being employed.

The linked product made by this reaction may be in the form of statistical mixture that is dependent on the charge of each of the acylating agents, and on the number of reactive sites on the linking compound. For example, if an equal molar ratio of the first and second acylating agents is reacted with ethylene glycol, the product would be comprised of a mixture of (1) about 50% of compounds wherein one molecule the first acylating agent is linked to one molecule of the second acylating agent through the ethylene glycol; (2) about 25% of compounds wherein two molecules of the first acylating agent are linked together through the ethylene glycol; and (3) about 25% of compounds wherein two molecules of the second acylating agent are linked together through the ethylene glycol.

The reaction between the linked acylating agents and the ammonia or amine may be carried out under salt, ester/salt, amide or imide forming conditions using conventional techniques. Typically, these components are mixed together and heated to a temperature in the range of about 20° C. up to the decomposition temperature of the reaction component and/ or product having the lowest such temperature, and in one embodiment about 50° C. to about 130° C., and in one embodiment about 80° C. to about 110° C.; optionally, in the presence of a normally liquid, substantially inert organic liquid solvent/diluent, until the desired salt product has formed.

The following examples are provided to illustrate the preparation of the fuel-soluble products (i) discussed above.

EXAMPLE 1

A twelve-liter, four-neck flask is charged with Adibis ADX 101G (7513 grams). Adibis ADX 101G, which is a product available from Lubrizol Adibis, is comprised of a polyisobutene substituted succinic anhydride mixture wherein 60% by weight is a first polyisobutene substituted succinic anhydride wherein the polyisobutene substituent has a number average molecular weight of 2300 and is derived from a polyisobutene having methylvinylidene isomer content of 80% by weight, and 40% by weight is a second polyisobutene substituted succinic anhydride wherein the polyisobutene substituent has a number average molecular weight of 1000 and is derived from a polyisobutene having methylvinylidene isomer content of 85% by weight. The product has a diluent oil content of 30% by weight and a succination ratio of 1.4 (after correcting for unreacted polyisobutene). The flask is equipped with an overhead stirrer, a thermocouple, an addition funnel topped with an N$_2$inlet, and a condenser. The succinic anhydride mixture is stirred and heated at 95° C., and ethylene glycol (137 grams) is added via the addition funnel over five minutes. The resulting mixture is stirred and maintained at 102–107° C. for 4 hours. Dimethylethanol amine (392 grams) is charged to the mixture over 30 minutes such that the reaction temperature does not exceed 107° C. The mixture is maintained at 100–105° C. for 2 hours, and filtered to provide a brown, viscous product.

EXAMPLE 2

A three-liter, four-neck flask is charged with Adibis ADX 101G (1410 grams). The flask is equipped with an overhead stirrer, a thermocouple, an addition funnel topped with an $N_2$ inlet, and a condenser. The succinic anhydride mixture is stirred and heated to 61° C. Ethylene glycol (26.3 grams) is added via the addition funnel over five minutes. The resulting mixture is stirred and heated to 105–110° C. and maintained at that temperature for 4.5 hours. The mixture is cooled to 96° C., and dimethylaminoethanol (77.1 grams) is charged to the mixture over 5 minutes such that the reaction temperature does not exceed 100° C. The mixture is maintained at 95° C. for 1 hour, and then at 160° C. for 4 hours. The product is a brown, viscous product.

The fuel-soluble product (i) may be present in the water-diesel fuel emulsion at a concentration of up to about 15% by weight based on the overall weight of the emulsion, and in one embodiment about 0.1 to about 15% by weight, and an one embodiment about 0.1 to about 10% by weight, and in one embodiment about 0.1 to about 5% by weight, and in one embodiment about 0.1 to about 2% by weight, and in one embodiment about 0.1 to about 1% by weight, and in one embodiment about 0.1 to about 0.7% by weight.

The Ionic or Nonionic Compound (ii)

The ionic or nonionic compound (ii) has a hydrophilic-lipophilic balance (HLB) in the range of about 1 to about 10, and in one embodiment about 4 to about 8. Examples of these compounds are disclosed in *McCutcheon's Emulsifiers and Detergents*, 1998, North American & International Edition. Pages 1–235 of the North American Edition and pages 1–199 of the International Edition are incorporated herein by reference for their disclosure of such ionic and nonionic compounds having an HLB in the range of about 1 to about 10. Useful compounds include alkanolamides, alkylarylsulfonates, amine oxides, poly(oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, fatty acid amides, glycerol esters, glycol esters, sorbitan esters, imidazoline derivatives, lecithin and derivatives, lignin and derivatives, monoglycerides and derivatives, olefin sulfonates, phosphate esters and derivatives, propoxylated and ethoxylated fatty acids or alcohols or alkyl phenols, sorbitan derivatives, sucrose esters and derivatives, sulfates or alcohols or ethoxylated alcohols or fatty esters, sulfonates of dodecyl and tridecyl benzenes or condensed naphthalenes or petroleum, sulfosuccinates and derivatives, and tridecyl and dodecyl benzene sulfonic acids.

In one embodiment, the ionic or nonionic compound (ii) is a fuel-soluble product made by reacting an acylating agent having about 12 to about 30 carbon atoms with ammonia or an amine. The acylating agent may contain about 12 to about 24 carbon atoms, and in one embodiment about 12 to about 18 carbon atoms. The acylating agent may be a carboxylic acid or a reactive equivalent thereof. The reactive equivalents include acid halides, anhydrides, esters, and the like. These acylating agents may be monobasic acids or polybasic acids. The polybasic acids are preferably dicarboxylic, although tri- and tetra-carboxylic acids may be used. These acylating agents may be fatty acids. Examples include myristic acid, palmitic acid, stearic acid, oleic acid, linoleic acid, linolenic acid, and the like. These acylating agents may be succinic acids or anhydrides represented, respectively, by the formulae wherein each of the foregoing formulae R is a hydrocarbyl group of about 10 to about 28 carbon atoms, and in one embodiment about 12 to about 20 carbon atoms. Examples include tetrapropylene substituted succinic acid or anhydride, hexadecyl succinic acid or anhydride, and the like. The amine may be any of the amines described above as being useful in making the fuel-soluble product (i). The product of the reaction between the acylating agent and the ammonia or amine may be a salt, an amide, an imide, or a combination thereof. The salt may be an internal salt involving residues of a molecule of the acylating agent and the ammonia or amine wherein one of the carboxyl groups becomes ionically bound to a nitrogen atom within the same group; or it may be an external salt wherein the ionic salt group is formed with a nitrogen atom that is not part of the same molecule. The reaction between the acylating agent and the ammonia or amine is carried out under conditions that provide for the formation of the desired product. Typically, the acylating agent and the ammonia or amine are mixed together and heated to a temperature in the range of from about 50° C. to about 250° C., and in one embodiment from about 80° C. to about 200° C.; optionally in the presence of a normally liquid, substantially inert organic liquid solvent/diluent, until the desired product has formed. In one embodiment, the acylating agent and the ammonia or amine are reacted in amounts sufficient to provide from about 0.3 to about 3 equivalents of acylating agent per equivalent of ammonia or amine. In one embodiment, this ratio is from about 0.5:1 to about 2:1, and in one embodiment about 1:1.

In one embodiment, the ionic or nonionic compound (ii) is an ester/salt made by reacting hexadecyl succinic anhydride with dimethylethanol amine in an equivalent ratio (i.e., carbonyl to amine ratio) of about 1:1 to about 1:1.5, and in one embodiment about 1:1.35.

The ionic or nonionic compound (ii) may be present in the water-diesel fuel emulsion at a concentration of up to about 15% by weight, and in one embodiment about 0.01 to about 15% by weight, and in one embodiment about 0.01 to about 10% by weight, and one embodiment about 0.01 to about 5% by weight, and in one embodiment about 0.01 to about 3% by weight, and in one embodiment about 0.1 to about 1% by weight.

The Water-Soluble Compound (iii)

The water-soluble compound may be an amine salt, ammonium salt, azide compound, nitro compound, alkali metal salt, alkaline earth metal salt, or mixtures of two or more thereof. These compounds are distinct from the fuel-soluble product (i) and the ionic or nonionic compound (ii) discussed above. These water-soluble compounds include organic amine nitrates, azides, and nitro compounds. Also included are alkali and alkaline earth metal carbonates, sulfates, sulfides, sulfonates, and the like.

Particularly useful are the amine or ammonium salts represented by the formula $$k[G(NR_3)_y]^{y^+}nX^{p-}$$

wherein G is hydrogen or an organic group of 1 to about 8 carbon atoms, and in one embodiment 1 to about 2 carbon atoms, having a valence of y; each R independently is hydrogen or a hydrocarbyl group of 1 to about 10 carbon atoms, and in one embodiment 1 to about 5 carbon atoms, and in one embodiment 1 to about 2 carbon atoms; $X^{p-}$ is an anion having a valence of p; and k, y, n and p are independently integers of at least 1. When G is H, y is 1. The sum of the positive charge $ky^+$ is equal to the sum of the negative charge $nX^{p-}$. In one embodiment, X is a nitrate ion; and in one embodiment it is an acetate ion. Examples include ammonium nitrate, ammonium acetate, methylammonium nitrate, methylammonium acetate, ethylene diamine diacetate, urea nitrate, and guanidinium nitrate. Ammonium nitrate is particularly useful.

In one embodiment, the water-solub'e compound (iii) functions as an emulsion stabilizer, i.e., it acts to stabilize the water-diesel fuel emulsion. Thus, in one embodiment, the water-soluble compound (iii) is present in the water-diesel fuel emulsion in an emulsion stabilizing amount.

In one embodiment, the water-soluble compound (iii) functions as a combustion improver. A combustion improver is characterized by its ability to increase the mass burning rate of the fuel composition. The presence of such a combustion improver has the effect of improving the power output of an engine. Thus, in one embodiment, the water-soluble compound (iii) is present in the water-diesel fuel emulsion in a combustion improving amount.

The water-soluble compound (iii) may be present in the water-diesel fuel emulsion at a concentration of about 0.001 to about 1% by weight, and in one embodiment from about 0.01 to about 1% by weight.

Cetane Improver

In one embodiment, the water-diesel fuel emulsion contains a cetane improver. The cetane improvers that are useful include peroxides, nitrates, nitrites, nitrocarbamates, and the like. Useful cetane improvers include nitropropane, dinitropropane, tetranitromethane, 2-nitro-2-methyl-1-butanol, 2-methyl-2-nitro-1-propanol, and the like. Also included are nitrate esters of substituted or unsubstituted aliphatic or cycloaliphatic alcohols which may be monohydric or polyhydric. These include substituted and unsubstituted alkyl or cycloalkyl nitrates having up to about 10 carbon atoms, and in one embodiment about 2 to about 10 carbon atoms. The alkyl group may be either linear or branched, or a mixture of linear or branched alkyl groups. Examples include methyl nitrate, ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, n-heptyl nitrate, n-octyl nitrate, 2-ethylhexyl nitrate, sec-octyl nitrate, n-nonyl nitrate, n-decyl nitrate, cyclopentyl nitrate, cyclohexyl nitrate, methylcyclohexyl nitrate, and isopropylcyclohexyl nitrate. Also useful are the nitrate esters of alkoxy substituted aliphatic alcohols such as 2-ethoxyethyl nitrate, 2-(2-ethoxy-ethoxy) ethyl nitrate, 1-methoxypropyl-2-nitrate, 4-ethoxybutyl nitrate, etc., as well as diol nitrates such as 1,6-hexamethylene dinitrate. A useful cetane improver is 2-ethylhexyl nitrate.

The concentration of the cetane improver in the water-diesel fuel emulsion may be at any concentration sufficient to provide the emulsion with the desired cetane number. In one embodiment, the concentration of the cetane improver is at a level of up to about 10% by weight, and in one embodiment about 0.05 to about 10% by weight, and in one embodiment about 0.05 to about 5% by weight, and in one embodiment about 0.05 to about 1% by weight.

Additional Additives

In addition to the foregoing materials, other diesel fuel additives which are well known to those of skill in the art may be used in the water-diesel fuel emulsions of the invention. These include dyes, rust inhibitors such as alkylated succinic acids and anhydrides, bacteriostatic agents, gum inhibitors, metal deactivators, upper cylinder lubricants, and the like. These additional additives may be used at concentrations of up to about 1% by weight based on the total weight of the water-diesel fuel emulsions, and in one embodiment about 0.01 to about 1% by weight.

The total concentration of chemical additives, including the foregoing emulsifiers, in the water-diesel fuel emulsions of the invention may range from about 0.05 to about 30% by weight, and in one embodiment about 0.1 to about 20% by weight, and in one embodiment about 0.1 to about 15% by weight, and in one embodiment about 0.1 to about 10% by weight, and in one embodiment about 0.1 to about 5% by weight.

Organic Solvent

The chemical additives, including the foregoing emulsifiers, may be diluted with a substantially inert, normally liquid organic solvent such as naphtha, benzene, toluene, xylene or diesel fuel to form an additive concentrate which is then mixed with the diesel fuel and water to form the water-diesel fuel emulsion. These concentrates generally contain from about 10% to about 90% by weight of the foregoing solvent.

The water-diesel fuel emulsions may contain up to about 60% by weight organic solvent, and in one embodiment about 0.01 to about 50% by weight, and in one embodiment about 0.01 to about 20% by weight, and in one embodiment about 0.1 to about 5% by weight, and in one embodiment about 5 0.1 to about 3% by weight.

Antifreeze Agent

In one embodiment, the water-diesel fuel emulsions of the invention contain an antifreeze agent. The antifreeze agent is typically an alcohol. Examples include ethylene glycol, propylene glycol, methanol, ethanol, glycerol and mixtures of two or more thereof. The antifreeze agent is typically used at a concentration sufficient to prevent freezing of the water used in the water-diesel fuel emulsions. The concentration is therefore dependent upon the temperature at which the fuel is stored or used. In one embodiment, the concentration is at a level of up to about 20% by weight based on the weight of the water-diesel fuel emulsion, and in one embodiment about 0.1 to about 20% by weight, and in one embodiment about 1 to about 10% by weight.

EXAMPLE 3

This example provides an illustrative example of the water-diesel fuel emulsions of the invention. The numerical values indicated below are in parts by weight.

| Components | A | B |
|---|---|---|
| ULSD Diesel Fuel | 76.48 | 88.24 |
| Demineralized Water | 20.00 | 10.00 |
| Product of Example 1 | 0.890 | 0.445 |
| Emulsifier 1[1] | 0.232 | 0.116 |

-continued

| Components | A | B |
|---|---|---|
| Organic Solvent[2] | 1.391 | 0.696 |
| 2-Ethylhexyl nitrate | 0.476 | 0.238 |
| Ammonium nitrate (54% by wt. $NH_4NO_3$ in water) | 0.532 | 0.266 |

[1]Ester/salt prepared by reacting a hexadecyl succinic anhydride with dimethylethanol amine at a mole ratio of 1:1.35.
[2]Aliphatic solvent.

The emulsion is prepared by mixing all of the ingredients in formulations A and B except for the water using conventional mixing. The resulting diesel fuel-chemical additives mixture is then mixed with the water under high-shear mixing conditions to provide the water-diesel fuel emulsion. The high-shear mixer is provided by Advanced Engineering Ltd. under Model No. ADIL 4S-30 and is identified as a four-stage multi-shear in-line mixer fitted with four superfine dispersion heads and a double acting mechanical seal.

EXAMPLE 4

Additional formulations for the water-diesel fuel emulsions are indicated below. The numerical values indicated below are in parts by weight. Emulsifier 1 indicated below is the same as indicated in Example 3. Emulsifier 2 is an ester/salt prepared by reacting polyisobutene ($M_n$=2000) substituted succinic anhydride (ratio of succinic groups to polyisobutene equivalent weights of 1.7) with dimethylethanol amine in an equivalent weight ratio of 1:1 (1 mole succinic anhydride acid group to 2 moles of amine). Emulsifier 3 is a succinimide derived from polyisobutene (Mn=1000) substituted monosuccinic anhydride and an ethylene polyamine mixture consisting of approximately 80% by weight heavy polyamine and 20% by weight diethylene triamine. The Organic Solvent is an aromatic solvent.

| | C | D | E | F | G |
|---|---|---|---|---|---|
| Diesel Fuel | 78.68 | 78.80 | 78.78 | 78.12 | 78.78 |
| Deionized Water | 16.70 | 19.70 | 20.00 | 20.00 | 20.00 |
| Emulsifier 2 | 0.600 | — | 0.500 | 0.510 | 0.500 |
| Emulsifier 1 | — | 0.600 | 0.083 | 0.214 | 0.083 |
| Emulsifier 3 | — | — | — | 0.297 | — |
| OrganicSolvent | 0.350 | 0.350 | 0.340 | — | 0.340 |
| 2-Ethylhexyl nitrate | 0.470 | 0.350 | 0.350 | 0.714 | 0.350 |
| Ammonium nitrate (54% by wt $NH_4NO_3$ inwater) | 0.200 | 0.200 | — | 0.150 | 0.200 |
| Ammonium nitrate (50% by wt $NH_4NO_3$ in water) | — | — | 0.200 | — | — |
| Methanol | 3.00 | — | — | — | — |

EXAMPLE 5

This example is illustrative of concentrates that can be used to make the water-diesel fuel emulsions of the invention. The numerical values indicated below are in parts by weight. The Emulsifier 1 indicated below is the same as indicated in Example 3. The Organic Solvent is an aromatic solvent.

| | H | I |
|---|---|---|
| Product of Example 1 | 34 | — |
| Product of Example 2 | — | 34 |
| Emulsifier 1 | 6 | 6 |
| Organic Solvent | 23.2 | 23.2 |
| 2-Ethylhexyl nitrate | 23.8 | 23.8 |
| Ammonium nitrate (54% by wt $NH_4NO_3$ in water) | 13 | 13 |

EXAMPLE 6

This example discloses water-diesel fuel emulsions using the concentrates disclosed in Example 5. In the table below all numerical values are in parts by weight.

| | J | K |
|---|---|---|
| Diesel Fuel | 79–81 | 79–81 |
| Water | 18–20 | 18–20 |
| Concentrate H | 1.5–3 | — |
| Concentrate I | — | 1.5–3 |

The Oxidation Catalyst

The oxidation catalyst used in accordance with the invention is selected from those catalysts which promote the chemical oxidation of carbon monoxide (CO), gaseous phase hydrocarbons (HC) and diesel particulate matter (PM). In one embodiment, the oxidation catalyst displays passive lean NOx catalytic activity. A catalyst which display lean NOx catalytic activity is a catalyst which selectively promotes the reduction of NOx by hydrocarbons. In this selective catalytic reduction, hydrocarbons selectively react with NOx, rather than with $O_2$, to form nitrogen, $CO_2$ and water. Passive lean NOx catalytic activity refers to the use of a catalyst in which no supplemental hydrocarbon addition is made.

Referring to the drawings, the oxidation catalyst may be in the form of a cellular monolith 10. The monolith may be housed in an in-line converter 30 or a converter muffler 40. The monolith substrate may be either a ceramic extrusion 12 or a corrugated metal foil assembly 14. The monolith is in the form of a honeycomb structure having small, parallel channels 20 running axially through it. The channel walls are coated with an intermediate layer of an inorganic oxide 16, called washcoat, in order to provide a high surface area. A catalyst 18 is deposited on the washcoat. These monoliths are sometimes referred to as "flow-through" structures. The cross-section is typically circular or oval, but asymmetric contours may be used. Exhaust gases flowing through the channels contact the catalyst and undergo catalytic reaction.

Figures 1, 2, 3, 4:
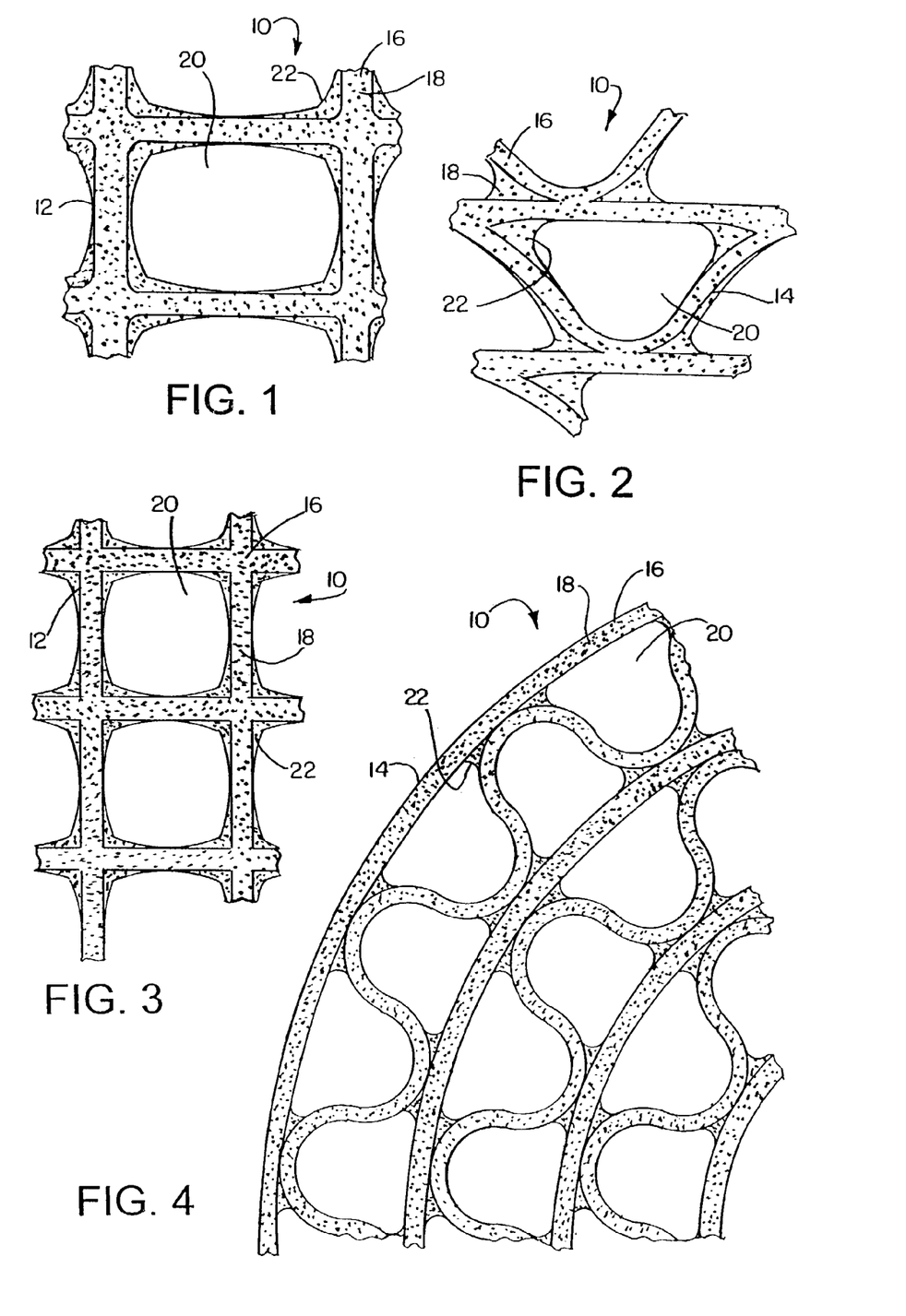
FIG. 1 is a cross-section of a flow-through channel of a cellular monolith having a square cross-section, the channel being comprised of a ceramic substrate, a washcoat overlying the substrate, and a catalyst supported by the washcoat.
FIG. 2 is a cross-section of a flow-through channel of a cellular monolith having a sinusoidal cross-section, the channel being comprised of a metal substrate, a washcoat overlying the substrate, and a catalyst supported by the washcoat.
FIG. 3 is a cross-section of a portion of a cellular monolith having plurality of parallel flow-through channels of the type illustrated in FIG. 1.
FIG. 4 is a cross-section of a portion of a cellular monolith having plurality of parallel flow-through channels of the type illustrated in FIG. 2.
Figure 5:
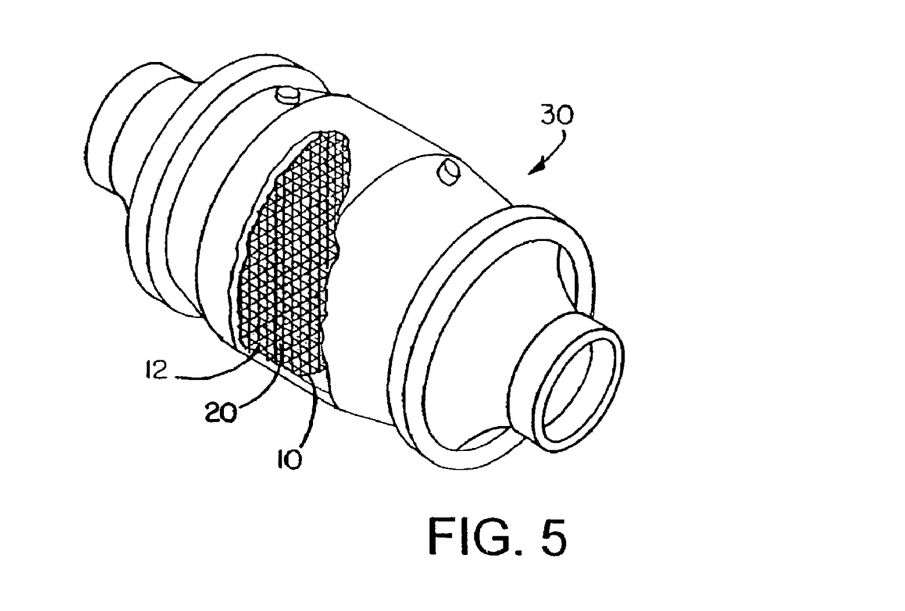
FIG. 5 is a partially cut-away schematic illustration of an in-line converter adapted for housing the cellular monolith illustrated in FIG. 3.
Figure 6:
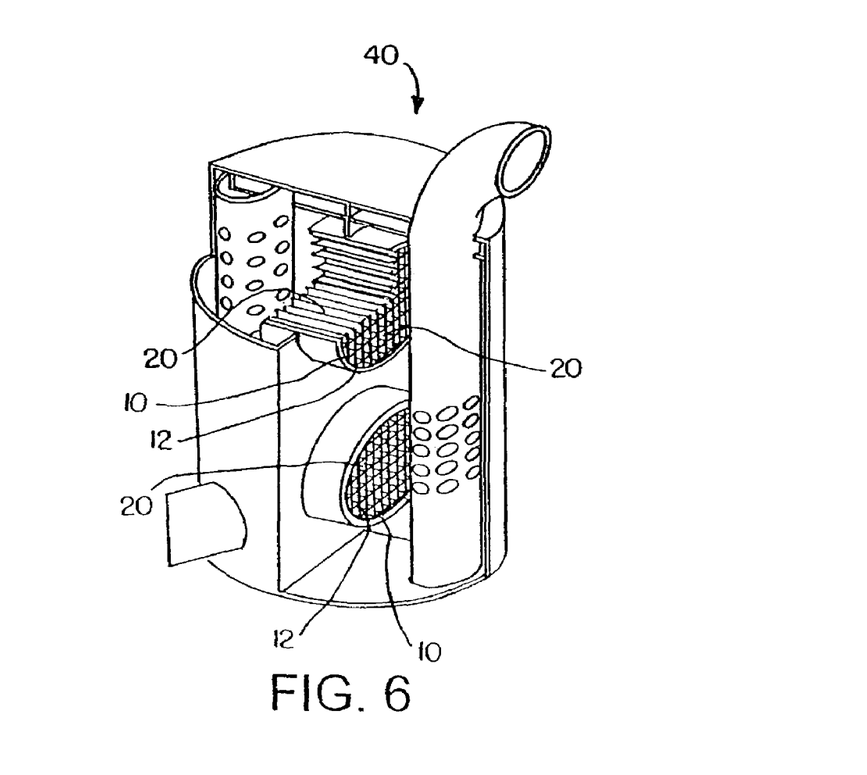
FIG. 6 is a partially cut-away schematic illustration of a converter muffler adapted for housing the cellular monolith illustrated in FIG. 3.

Monolith catalyst substrates may be made of ceramics or metal. Ceramic substrates (honeycombs) usually have channels or cells with square cross sections (FIGS. 1 and 3), while most metallic substrates have channels or cells with sinusoidal cross sections. (FIGS. 2 and 4). Other channel cross sections may be used, including triangular, hexagonal, trapezoidal and round. The number of cells may vary from about 10 to about 600 cells per square inch (cpsi), and in one embodiment about 100 to about 500 cpsi, and in one embodiment about 200 to about 400 cpsi.

The walls of ceramic honeycombs have relatively large pores and low specific surface areas of typically less than 1

$m^2/g$, and in one embodiment about 0.3 $m^2/g$. However, the walls of the ceramic honeycomb structure typically has a relatively large geometric surface area, for example, about 16 $cm^2/cm^3$ to about 30 $cm^2/cm^3$, and in one embodiment about 23.5 $cm^2/cm^3$. This high geometric surface area is further extended by the application of the washcoat, which further increases the surface area. Foils used as metal substrates are not porous. The metal substrate may be pre-oxidized to form surface roughness using $Al_2O_3$ prior to applying the washcoat. This oxidizing step enhances adhesion of the washcoat. The washcoat may be composed of a porous, high surface area inorganic oxide such as one or more zeolites (e.g., ZSM5), $Al_2O_3$, $SiO_2$, $TiO_2$, $CeO_2$, $ZrO_2$, $V_2O_5$, $La_2O_3$, and mixtures of two or more thereof. The surface area of the washcoat is typically in the range about 5 to about 100 $m^2/g$, and in one embodiment about 10 to about 15 $m^2/g$. The catalytic species is deposited on the surface and within the pores of the washcoat. The catalyst may be Pt, Pd, Rh, Ir, Ru, V, Cr, Mn, Fe, Co, Ni, Cu, Zn, Ag, Ce, Ga, or a mixture of two or more thereof. Useful catalysts include Pt, Pd, Rh, Ir, and mixtures of two or more thereof. The catalyst is typically in the form of a metal or a mixture of metal and oxide although the metal species is believed to be the portion of the catalyst that provides catalytic activity. The average particle size of the catalyst applied to the washcoat is typically in the range of up to about 110 nanometers, and in one embodiment up to about 40 nanometers, and in one embodiment about 10 to about 20 nanometers.

The washcoat layer on a metallic foil and on a ceramic substrate is illustrated in FIGS. 1 and 3, and FIGS. 2 and 4, respectively. The washcoat may be applied to the metal or ceramic substrate from a water based slurry having a solids content of, for example, about 30% to about 50% by weight. The wet washcoated monolith is then dried at a temperature of about 80° C. to about 200° C., and calcined at a temperature of about 200° C. to about 1000° C. The thickness of the washcoat layer may be in the range of about 15 to about 50 microns, and in one embodiment about 20 to about 40 microns. Thicker washcoat deposits 22 ("fillets") are formed in the cell corners, especially in the sinusoidal channels of metallic substrates. In one embodiment, the metal foil is washcoated prior to forming the honeycomb. In this embodiment, clean channels with no fillets in the corners are formed, but these tend to compromise the mechanical strength and durability of the monolith.

The ceramic monolith may be made of corderite, $2MgO \cdot 2Al_2O_3 \cdot 5SiO_2$. In one embodiment, the ceramic monolith is comprised of a major amount (in excess of about 90%) of corderite and a minor amount of spinel. The ceramic monolith may be manufactured using an extrusion process. Raw materials such as alumina, talc, clay (kaolinite), and silica are reduced to powder and blended into a water-based paste. Additives which may be added in the process include lubricants (e.g. ethylene glycol), bonding agents (e.g. methylcellulose), and fluxes (alkaline hydroxides). Extrusions made from the paste are dried and cut to the desired length.

Metal foil may be corrugated, catalyst coated, and folded into a package to match the housing or shell contour of the catalytic converter or converter muffler. The metal may be steel or stainless steel. The foil thickness may be in the range of about 0.04 to about 0.15 mm, and in one embodiment about 0.05 mm. A slanted or "herring-bone" corrugation pattern may be used. The use of such a pattern makes it possible to use a single strip of foil. The folded foil package may be placed into a housing or shell.

The catalytic species may be applied to the washcoat using techniques known in the art. These include impregnation, incipient wetness or capillary impregnation, electrostatic adsorption, ion exchange, and the like. Impregnation involves soaking the washcoated monolith in an aqueous solution containing a salt (precursor) of the catalytic element or elements. In one embodiment, the washcoated monolith is soaked in the aqueous solution and capillary and/or electrostatic forces distribute the salt over the internal surface of the porous network. The salt generating the cations or anions containing the catalytic element are chosen to be compatible with the surface charge of the washcoated monolith to obtain efficient adsorption or, in some cases, ion exchange. For example, $Pt(NH_3)_2^{+2}$ salts can ion exchange with the $H^+$ present on the hydroxy containing surfaces of $Al_2O_3$. Anions such as $PtCl^{-2}$ are electrostatically attracted to the $H^+$ sites.

Electrostatic adsorption involves using a precursor salt that generates a charge opposite to that of the surface of the washcoated monolith. In weakly alkaline solutions, the surface charge on $Al_2O_3$ or $SiO_2$ is generally negative, so cations preferentially adsorb uniformly over the entire surface. Cations such as $Pd^{+2}$, $Pt(NH_3)_2^{2+}$, and others derived from nitrates or oxalate salts may be used.

Ion exchange involves the use of a cation salt containing the catalytic species which exchange with cations on the surface of the washcoat. This technique may be used when a zeolite washcoat is used. In one embodiment, the acid form of the zeolite (HZ) is first treated with an aqueous solution containing $NH_4^+(NH_4NO_3)$ to form the ammonium exchanged zeolite ($NH_4^+Z^-$). This is then treated with a salt solution containing a catalytic cation forming the metal exchanged zeolite (MZ). The finished exchanged zeolite is washed, dried and an aqueous slurry is then prepared for coating onto the walls of the monolith.

Incipient wetness or capillary impregnation involves dissolving the precursor salt of the catalytic element or elements in an amount of water equal to the water pore volume of the washcoated monolith, and soaking the monolith in the solution to distribute the solution over the washcoat surface. The water pore volume is determined by slowly adding water to the washcoated monolith until it is saturated, as evidenced by the beading of excess water. Once dried, the washcoated monolith pore structure contains a predetermined amount of catalytic species.

In one embodiment, a multiple catalyst system is used and a segregated washcoat is used to physically separate one or more of the catalysts. The catalysts are separated to prevent undesirable reactions with each other, with washcoat components and/or with the metal or ceramic substrate. The catalytic species may be separated by fixing each to a particular base metal oxide of the washcoat before the washcoat is applied to the metal or ceramic substrate. An example of such a catalyst is a tri-metal system which includes Pt, Pd and Rh. The first layer of the catalyst is composed of $Pd/Al_2O_3$. The second (surface) layer is composed of Rh/Pt/Ce—Zr. This design prevents the formation of palladium-rhodium alloys which may cause catalyst deactivation.

The catalyst loading may be in the range of about 0.2 to about 75 grams per cubic foot ($g/ft^3$), and in one embodiment about 5 to about 15 $g/ft^3$.

Following application of the catalytic species, it is advantageous to fix the catalytic species so subsequent processing steps such as washing, drying, and high-temperature calcination do not cause significant movement or agglomeration of the catalytic species. One approach involves adjusting the pH of the solution used to precipitate the catalytic species in the pores of the washcoated monolith. For example, by presoaking $Al_2O_3$ in a solution of $NH_4OH$, the addition of an acidic Pd salt, such as $Pd(NO_3)_2$, precipitates hydrated PdO on the surfaces of the pores within the carrier. An alternative approach involves the use of reducing agents (e.g., formic acid) in the precipitation of the catalytic species as metals within the pore structure of the carrier. This method is advantageously used with precious metals because they tend to be easily reduced to their metallic states. An advantage of the use of such reducing agents is that upon subsequent heat treatment such reducing agents tend to leave no residue.

EXAMPLE 7

The following test illustrates the inventive process. The vehicle tested is a Euro II Olympian B10A bus which is mechanically fuel injected and equipped with an automatic gearbox. The diesel engine has a maximum rated power of 183 kW at 2000 rpm, and 1050 Nm torque at 1450 rpm. A chassis dynamometer is installed on the vehicle. The vehicle is tested at curb weight with an additional load value simulating a typical passenger load. The tests are conducted at a dynamometer road load of 13,723 kg, which represents the vehicle weight plus a nominal passenger load of 75%.

Six tests are conducted. Test Nos. 1 and 3 are illustrative of the invention while Test Nos. 2 and 4–6 are provided for purposes of comparison. Test Nos. 1 and 2 are conducted using as the fuel formulation A from Example 3. Test Nos. 3 and 4 are conducted using as the fuel formulation B from Example 3. Test Nos. 5 and 6 are conducted using a conventional ULSD fuel. For test Nos. 1, 3 and 6 an oxidation catalyst is used while no catalyst is used with Test Nos. 2, 4 and 6.

The oxidation catalyst is housed in an integrated converter muffler that is commercially available under the tradename AZ Purimuffler. The test unit uses two, 46.5 cells/cm², large frontal area substrates each with a catalyst volume of 5.05 liters for a total catalyst volume of 10.1 liters. The substrates are ceramic substrates with a zeolite washcoat and a platinum catalytic component supported by the washcoat. The test unit is designed as a direct replacement for the original vehicle muffler and affords comparable exhaust backpressure and sound attenuation. Although the use of formulation A for the fuel in Test No. 1 results in slightly reduced power, there is no reported effect on the vehicle's ability to follow the test cycle as prescribed.

The vehicle is tested over the Millbrook London Transport Bus (MLTB) Cycle. The MLTB test cycle is an actual driving cycle developed from monitoring an actual in-service bus operating in London, England. The cycle represents London Transport Bus Route 159, from Brixton Station via Lambeth Bridge to Trafalgar Square to Oxford Circus along Oxford Street and finally to the end of Baker Street. The overall length of the cycle is 2281 seconds representing a total distance of 8.92 km.

TABLE 1

The results of the tests are indicated in Table 1. The numerical values in Table 1 are in grams of emission per kilometer of vehicle travel.

| Test | Fuel | Oxidation catalyst | HC* (g/km) | CO** (g/km) | NO$_x$*** (g/km) | PM**** (g/km) | CO$_2$***** (g/km) |
|---|---|---|---|---|---|---|---|
| 1 | Formulation A | Yes | 0.055 | 0.046 | 11.062 | 0.055 | 1343.6 |
| 2 | Formulation A | No  | 0.579 | 1.589 | 11.474 | 0.103 | 1365.4 |
| 3 | Formulation B | Yes | 0.068 | 0.082 | 11.947 | 0.093 | 1347.9 |
| 4 | Formulation B | No  | 0.668 | 1.586 | 12.742 | 0.146 | 1386.8 |
| 5 | ULSD | Yes | 0.054 | 0.053 | 13.878 | 0.142 | 1440.3 |
| 6 | ULSD | No  | 0.654 | 1.516 | 14.002 | 0.182 | 1404.3 |

HG* refers to gaseous hydrocarbon emissions.
CO** refers to gaseous carbon monoxide emissions.
NO$_x$*** refers to gaseous nitrogen oxide emissions.
PM**** refers to diesel particulate matter.
CO$_2$***** refers to gaseous carbon dioxide emissions.

The foregoing results demonstrate, at least in one embodiment, a synergistic result whereby the water-fuel emulsion (i.e., Formulation A) used in combination with the oxidation catalyst provides improved pollution reduction when compared to the cumulative affect of a diesel fuel (e.g., ULSD) used in combination with an oxidation catalyst and a water-fuel emulsion used (i.e., Formulation A) without an oxidation catalyst. In this regard, the results for PM reduction are indicated below. The baseline of 0.182 g/km is taken from Test No. 6 wherein ULSD is used with no catalyst.

PM reduction (Formulation A+catalyst)
+0.182 (baseline)−0.055=0.127 g/km
PM reduction (Formulation A without catalyst)
=0.182 (baseline)−0.103=0.079 g/km
PM reduction (ULSD with catalyst)
=0.182 (baseline)−0.142=0.040 g/km Synergy for PM reduction is indicated by the fact that the reduction using Formulation A+catalyst (0.127 g/km) is greater than the cumulative effect of the reduction for Formulation A without catalyst and ULSD with catalyst (0.079+0.040=0.119 g/km).

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:
1. A process for reducing the level of pollutants in the exhaust of a diesel engine, comprising:
combusting a stabilized water-diesel fuel emulsion in the engine, the combustion of the emulsion generating an exhaust gas, the exhaust gas comprising carbon monoxide, gaseous phase hydrocarbons and diesel particulate matter, and
flowing the exhaust gas over an oxidation catalyst to oxidize the carbon monoxide, gaseous phase hydrocarbons and diesel particulate matter
wherein the oxidation catalyst displays passive lean NOx catalytic activity and is in the form of a cellular monolith comprising a structure having parallel chan- nels running through it and the process does not require supplemental addition of hydrocarbon to the exhaust gas.

2. The process of claim 1 wherein the diesel engine comprises a mobile power plant.

3. The process of claim 1 wherein the diesel engine comprises a stationary power plant.

4. The process of claim 1 wherein the diesel engine comprises a two-stroke per cycle engine.

5. The process of claim 1 wherein the diesel engine comprises a four-stroke per cycle engine.

6. The process of claim 1 wherein the diesel engine comprises an on-highway engine or an off-highway engine.

7. The process of claim 1 wherein the exhaust gas further comprises NOx and the oxidation catalyst reacts with the $NO_x$ to form nitrogen, carbon dioxide and water.

8. The process of claim 1 wherein the cellular monolith is housed within an in-line converter or a converter muffler.

9. The process of claim 1 wherein the monolith comprises a ceramic extrusion.

10. The process of claim 1 wherein the monolith comprises a metal foil.

11. The process of claim 1 wherein the monolith is made of a material comprising corderite.

12. The process of claim 1 wherein the exhaust gas further comprises NOx and the passive lean oxidation catalyst causes at least a portion of the gaseous phase hydrocarbons to selectively react with the NOx rather than with $O_2$ to form nitrogen, carbon dioxide and water.

13. The process of claim 1 wherein the channels have interior channel walls which are coated with a washcoat layer, and a catalyst is deposited on the washcoat layer.

14. The process of claim 13 wherein the washcoat layer comprises zeolite, $Al_2O_3$, $SiO_2$, $TiO_2$, $CeO_2$, $ZrO_2$, $V_2O_5$, $La_2O_3$, or a mixture of two or more thereof.

15. The process of claim 13 wherein the catalyst deposited on the washcoat layer comprises Pt, Pd, Rh, Ir, Ru, V, Cr, Mn, Fe, Co, Ni, Cu, Zn, Ag, Ce, Ga, or a mixture of two or more thereof.

16. The process of claim 13 wherein the catalyst deposited on the washcoat layer comprises Pt, Pd, Rh, Ir or a mixture of two or more thereof.

17. The process of claim 13 wherein the washcoat layer comprises a segregated washcoat, and the catalyst comprises a multiple catalyst system.

18. The process of claim 17 wherein the multiple catalyst system comprises a tri-metal system.

19. The process of claim 17 wherein the multiple catalyst system comprises Pt, Pd and Rh.

20. A process for reducing the level of pollutants in the exhaust of a diesel engine, comprising:

combusting a stabilized water-diesel fuel emulsion in the engine, the combustion of the emulsion generating an exhaust gas, the exhaust gas comprising carbon monoxide, gaseous phase hydrocarbons and diesel particulate matter; and flowing the exhaust over an oxidation catalyst to oxidize the carbon monoxide, gaseous phase hydrocarbons and diesel particulate matter, wherein said oxidation catalyst displays passive lean NOx catalytic activity and is comprised of a cellular monolith comprising parallel flow-through passages of ceramic or metal coated with a washcoat comprised of zeolite, $Al_2O_3$, $SiO_2$, $TiO_2$, $CeO_2$, $ZrO_2$, $V_2O_5$, $La_2O_3$, or mixtures of two or more thereof, said washcoat supporting a catalyst selected from the group consisting of Pt, Pd, Rh, Ir, Ru, V, Cr, Mn, Fe, Co, Ni, Cu, Zn, Ag, Ce, Ga, or a mixture of two or more thereof and the process does not require supplemental addition of hydrocarbon to the exhaust gas.

21. The process of claim 20 wherein said catalyst is Pt, Pd, Rh, Ir, or a mixture of two or more thereof.

22. The process of claim 20 wherein said oxidation catalyst is housed in an in-line converter or a converter muffler.

23. The process of claim 20 wherein the exhaust gas further comprises NOx and the passive lean oxidation catalyst causes at least a portion of the gaseous phase hydrocarbons to selectively react with the NOx rather than with $O_2$ to form nitrogen, carbon dioxide and water.

* * * * *